US007091899B2

(12) United States Patent
Imamura

(10) Patent No.: US 7,091,899 B2
(45) Date of Patent: Aug. 15, 2006

(54) REMOTE CONTROL TRANSMITTER

(75) Inventor: Yasuhiro Imamura, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 209 days.

(21) Appl. No.: 10/801,200

(22) Filed: Mar. 16, 2004

(65) Prior Publication Data

US 2004/0222914 A1 Nov. 11, 2004

(30) Foreign Application Priority Data

Mar. 18, 2003 (JP) ............................. 2003-073843

(51) Int. Cl.
*G08C 19/12* (2006.01)
(52) U.S. Cl. ..................... 341/176; 429/7; 429/48; 429/96; 361/751; 320/135
(58) Field of Classification Search ............... 341/173, 341/176; 429/7, 48, 96; 340/571; 361/751; 320/135
See application file for complete search history.

(56) References Cited

U.S. PATENT DOCUMENTS

| | | | | |
|---|---|---|---|---|
| 4,251,604 A | * | 2/1981 | Umemoto | 429/98 |
| 4,362,396 A | * | 12/1982 | Perrot | 368/203 |
| 4,407,590 A | * | 10/1983 | Ohno et al. | 368/204 |
| 4,539,275 A | * | 9/1985 | Plasse | 429/152 |
| 4,751,150 A | * | 6/1988 | Oogita et al. | 429/1 |
| 4,977,042 A | * | 12/1990 | Chiyajo et al. | 429/49 |
| 5,360,683 A | * | 11/1994 | Broadfield | 429/99 |
| 5,517,177 A | * | 5/1996 | Cantrall | 340/571 |
| 5,912,092 A | * | 6/1999 | Maruyama et al. | 429/96 |
| 6,187,472 B1 | * | 2/2001 | Shiota et al. | 429/127 |
| 6,439,738 B1 | * | 8/2002 | Matthews et al. | 362/194 |
| 6,524,732 B1 | * | 2/2003 | Iwaizono et al. | 429/7 |
| 6,765,364 B1 | * | 7/2004 | Fang | 320/110 |
| 6,911,802 B1 | * | 6/2005 | Takeshita et al. | 320/107 |
| 6,977,125 B1 | * | 12/2005 | Oogaku et al. | 429/180 |
| 6,989,652 B1 | * | 1/2006 | Saeki et al. | 320/134 |
| 6,994,926 B1 | * | 2/2006 | Ikeuchi et al. | 429/7 |

FOREIGN PATENT DOCUMENTS

JP 10-284030 10/1998

* cited by examiner

*Primary Examiner*—Albert K. Wong
(74) *Attorney, Agent, or Firm*—RatnerPrestia

(57) ABSTRACT

Hook portion is formed on sheet an electric discharge preventing sheet put between battery and electrode. Hook portion which is deformable with a prescribed force comes into contact with holder 6 retaining electric discharge preventing sheet. Therewith, a remote control transmitter is provided, in which sheet hardly comes off during storage and transportation, and battery is securely prevented from exhausting.

9 Claims, 5 Drawing Sheets

(a)

(b)

(c)

(d)

REMOTE CONTROL TRANSMITTER

BACKGROUND OF THE INVENTION

1. Field of the Invention

The present invention relates to a remote control transmitter to be used for remotely controlled television, video recorder, air conditioner and other various electronic devices.

2. Description of the Related Art

Television, video recorder, air conditioner and other electronic devices are recently compacted and light-weighted. In remote control transmitter remotely controlling these devices, a thinned and light-weighted card type is as well widely used. Many of this type of remote control transmitter use a button type battery in a disc shape, attaining a thinned and lighter weighted transmitter.

A conventional remote control transmitter of this type is described hereinafter using drawings FIG. 4 and FIG. 5.

FIG. 4 is a cross-sectional view of the conventional remote control transmitter and FIG. 5 is an exploded perspective view of the remote control transmitter. The drawings show that opening 1A is formed at a right side of under-housing 1 made of an insulating resin, and wiring board 3 having a plurality of conductive patterns on both sides of the board is installed (not illustrated) inside upper-housing 2 of a similar insulating resin.

On both sides of wiring board 3, electronic components including a light emitting diode and a microprocessor are mounted (not illustrated) forming control circuit 4 and transmitting a remote control signal such as of infrared light. On a side of wiring board 3, operating body 5 of an elastic rubber is placed, and a plurality of operating portions 5A of operating body 5 are projected movably in up and down directions through upper-housing 2.

Holder 6 made of an insulating resin holds button type battery 7 in a disc shape inside. Holder 6 is fit into under-housing 1 through opening 1A, enabled to be set in and taken out of the housing. Electrode 8 made of a conductive metal and connected to control circuit 4 is elastically contacted a side of battery 7 at an end portion of the electrode.

Sheet 9 made of an insulating film is put between battery 7 and electrode 8, electrically insulating battery 7 and electrode 8.

When the remote control transmitter is assembled, sheet 9 is inserted into under-housing 1 through opening 1A with holder 6 holding battery 7 as illustrated in FIG. 5, after wiring board 3 and operating body 5 have been installed inside under-housing 1 and upper-housing 2.

Sheet 9 insulates electrical contact between battery 7 and electrode 8. Namely, sheet 9 is used as an electric-discharge-insulating sheet, allowing the transmitter to be stored and transported without battery 7 is discharged and exhausted. When the remote control transmitter is initially used, sheet 9 is pulled out with its right end in FIG. 4, then battery 7 is elastically contacted by electrode 8 supplying an electric power to control circuit 4 and enabling the transmitter to be used.

In above constitution, when the remote control transmitter is directed to an electronic device then a designated operating portion 5A is depressed, a corresponding remote control signal of infrared-light is transmitted from control circuit 4 to the electronic device. If operating portion 5A related to power supply or volume control is depressed for example, power on-off or volume control of the electronic device is remotely controlled. The conventional remote control transmitter is constituted in this manner.

As prior art technical information related to the present invention, Japanese Patent Application No. H10-284030 can be referred to.

However, in the above-mentioned conventional remote control transmitter, because sheet 9 preventing the battery from electrical discharge is put between battery 7 and electrode 8 and held only with a resilient power of electrode 8, the sheet easily comes off during storage and transportation, causing a problem of battery exhaustion.

SUMMARY OF THE INVENTION

The present invention is to solve an ordinary problem mentioned above, and aims to provide a remote control transmitter in which a sheet preventing electric discharge hardly comes off, and a battery is securely prevented from exhausting.

In order to achieve above objective, the remote control transmitter in this invention includes a hook portion coming into contact with a housing or with a holder in a sheet which is put between the battery and an electrode. The hook portion which is deformable with a prescribed force comes into contact with the housing or the holder, retaining the sheet preventing electric discharge in position. Thus, the remote control transmitter is obtained, with which the sheet preventing electric discharge hardly comes off during storage and transportation therefore the battery is securely prevented from exhausting, and the sheet is easily removed when the transmitter starts to be used.

The hook portion of the remote control transmitter in this invention is in one of shapes of a hole and a notch. With the shape, the hook portion is formed at the same time as an external form of the sheet by a stamping work or by a cutting work, so that the sheet is produced at a low price.

DESCRIPTION OF THE PREFERRED EMBODIMENTS

An exemplary embodiment according to the present invention is described hereinafter using drawings FIG. 1 to FIG. 3.

Exemplary Embodiment

Figure 1:
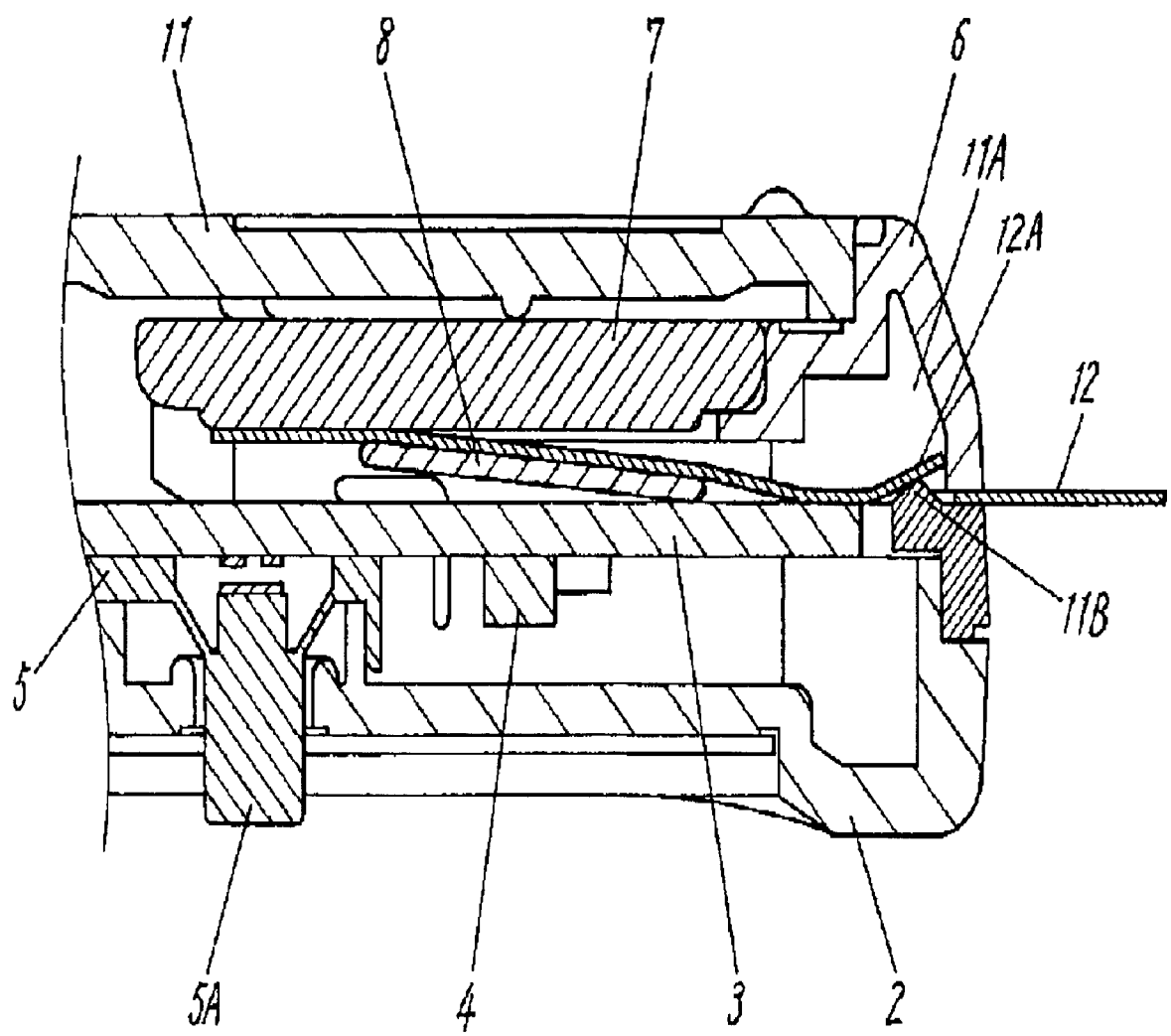
FIG. 1 is a cross-sectional view of a remote control transmitter in accordance with an exemplary embodiment of the present invention.
Figure 2:
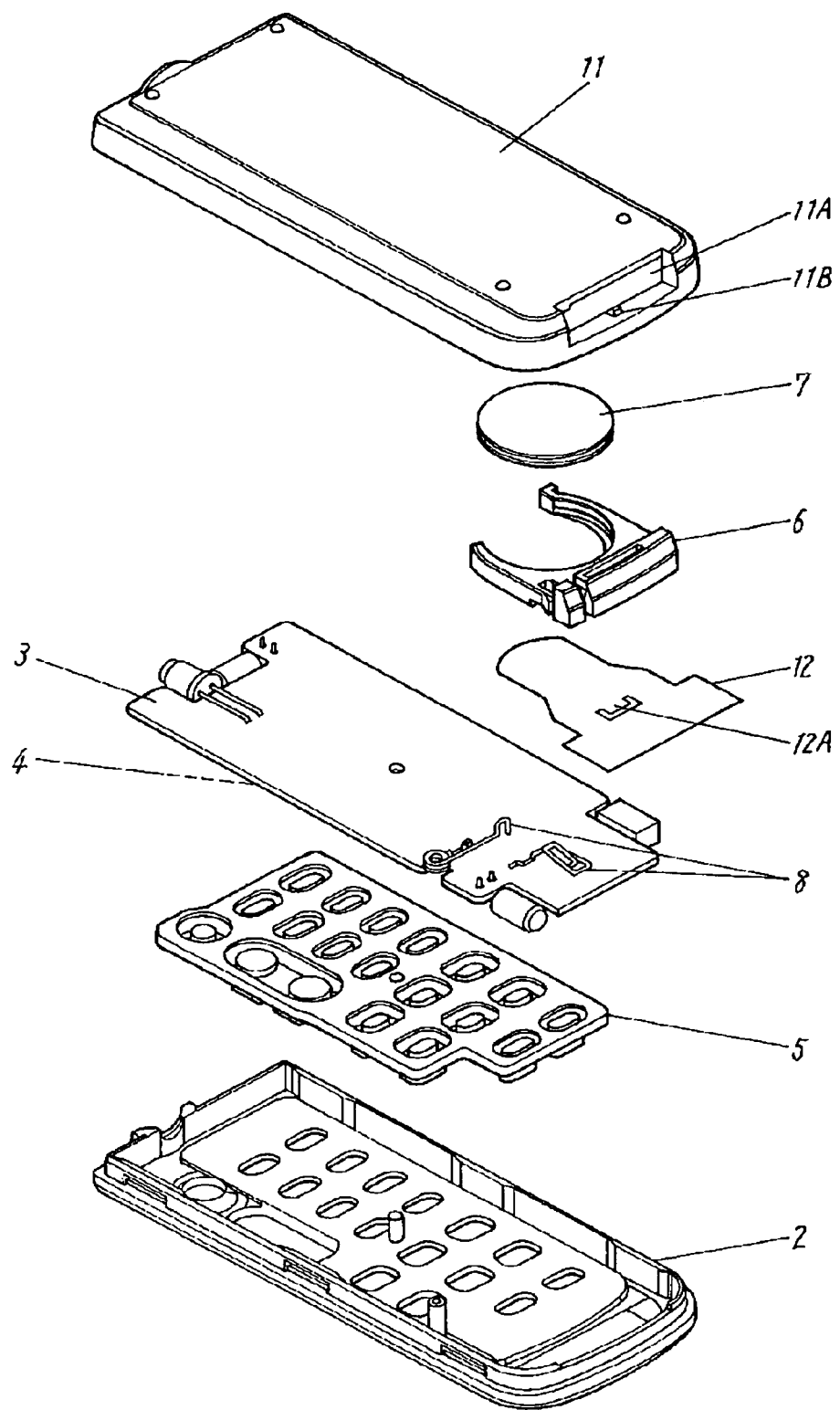
FIG. 2 is an exploded perspective view of the remote control transmitter.

FIG. 1 is a cross-sectional view of a remote control transmitter in accordance with an exemplary embodiment of the present invention, and FIG. 2 is an exploded perspective view of the remote control transmitter. As shown in FIG. 1 and FIG. 2, under-housing 11 and upper-housing 2 made of an insulating resin such as polystyrene or ABS are united forming a housing. Under-housing 11 has opening 11A formed at a right side as shown in FIG. 1. Inside the housing, is installed wiring board 3 made of a paper phenol or of a glass-contained epoxy and formed of a plurality of conductive patterns formed on both sides of the board (not illustrated).

On the both sides of the board, electronic components including a light emitting diode and a microprocessor are mounted (not illustrated), forming control circuit 4 and transmitting a remote control signal such as of infrared light. On a side of wiring board 3, operating body 5 of an elastic rubber is placed and a plurality of operating portions 5A are projected movably in up and down directions through upper-housing 2.

Holder 6 of an insulating resin such as polyoxide methylene or ABS, holds a disc shape of battery so called a button type battery 7 inside the holder. Holder 6 is fit into under-housing 11 through opening 11A and is enabled to be put in and out. Electrode 8 of a conductive metal connected to control circuit 4 elastically contact a side of battery 7 at an end portion of the electrode.

Sheet 12 of such as of a polyester film is put between battery 7 and electrode 8. Sheet 12 is to prevent an electric discharge and sheet 12 shields electrical contact between battery 7 and electrode 8. As illustrated in FIG. 2, sheet 12 includes hook portion 12A in a tongue shape. Hook portion 12A is preformed by such as notching. When sheet 12 is inserted, hook portion 12A is bent upward by protrusion 11B formed at opening 11A of under-housing 11, and an end of hook portion 12A comes into contact with an inside wall of holder 6, as shown in FIG. 1.

In an assembling process of the remote control transmitter, sheet 12 is inserted into under-housing 11 through opening 11A with holder 6 holding battery 7, after wiring board 3 and operating body 5 have been installed inside under-housing 11 and upper-housing 2, similarly as in case of a transmitter in a conventional technology.

Sheet 12 insulates electrical contact between battery 7 and electrode 8, therewith the remote control transmitter is stored and transported without battery 7 is discharged and exhausted. Particularly, as noted, sheet 12 is held by the end portion of hook portion 12A in the tongue shape coming into contact with the inside wall of holder 6, in addition to that the sheet is retained with a resilient force of electrode 8. The remote control transmitter according to the exemplary embodiment is so constituted that sheet 12 will not easily come off when it might be pulled with a light force.

To make the remote control transmitter usable at a beginning, a portion of sheet 12 appeared outside the remote control transmitter must be pulled out strongly, so that sheet 12 is removed. With this pull force, hook portion 12A in the tongue shape is distorted leftward in FIG., 1, consequently sheet 12 is pulled out, battery 7 is then resiliently contacted by electrode 8 supplying a power to control circuit 4, and the transmitter becomes usable.

In the above constitution, after sheet 12 is removed, if the remote control transmitter is directed to an electronic device and a designated operating portion 5A is depressed, a corresponding electric signal is transmitted from control circuit 4 to the electronic device. If operating portion 5A related to power supply or volume control is depressed, power on-off or volume increase and decrease of the electronic device is remotely operated.

As described, in the exemplary embodiment, hook portion 12A is formed in electric discharge preventing sheet 12 put between battery 7 and electrode 8, and the hook portion comes into contact with holder 6. Because hook portion 12A which is deformable with a prescribed force comes into contact with holder 6 and retains sheet 12, the remote control transmitter is provided in which sheet 12 hardly comes off during storage and transportation and battery 7 is securely prevented from exhausting.

Moreover, by designing hook portion 12A into a shape of notch or of hole, hook portion 12A can be formed at a same time as an external form of sheet 12 is formed by a stamping work or a cutting work, so that the sheet is produced at a low price.

In the above explanation, hook portion 12A in the shape of tongue is bent upward by protrusion 11B so as the end of the hook portion comes into contact with the inside wall of holder 6. However, the hook portion can be bent beforehand like hook portion 12B in tongue shape, as shown in a perspective view of FIG. 3(*a*).

Figure 3:
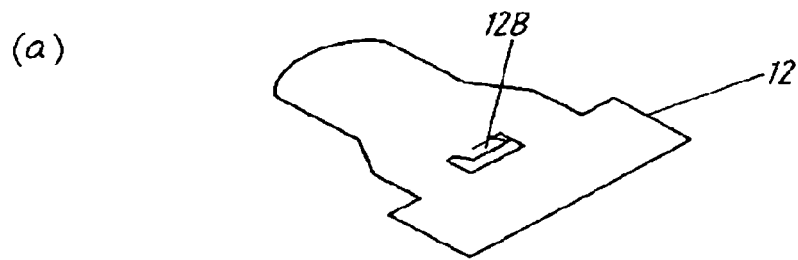
FIG. 3 is a perspective view of a sheet of the remote control transmitter.
Figure 3:
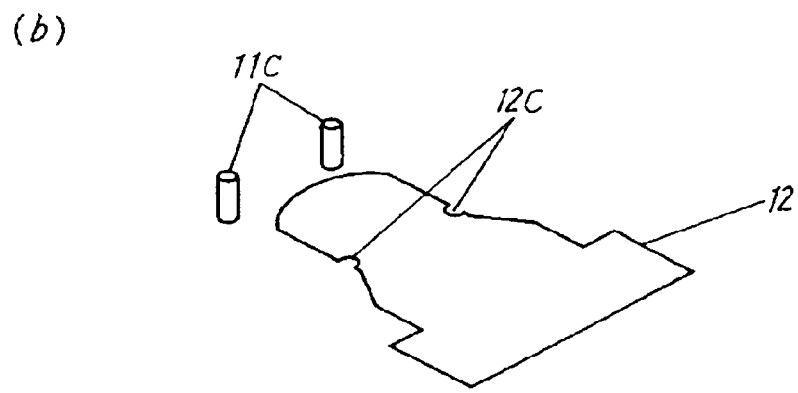
Figure 3:
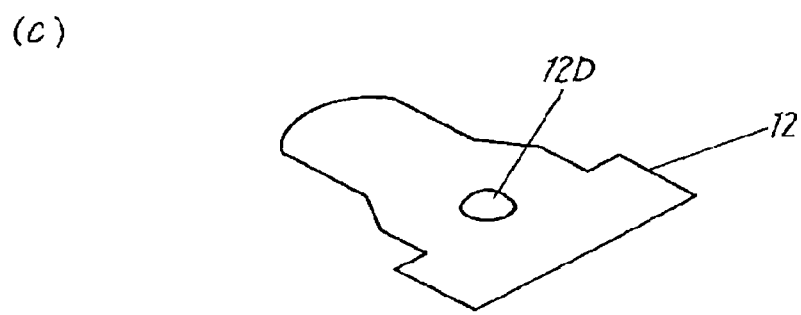
Figure 3:
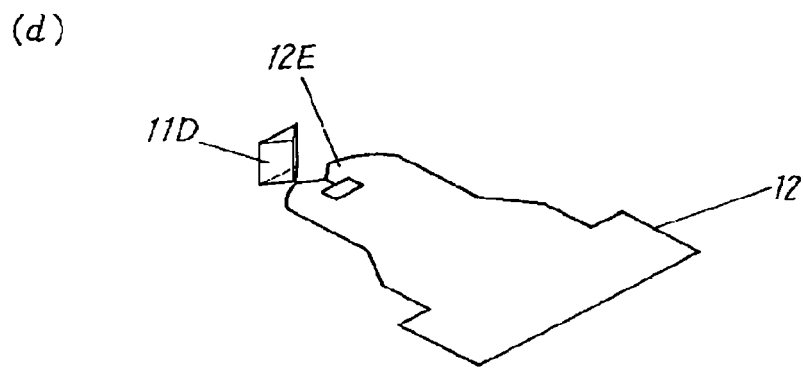
Figure 4:
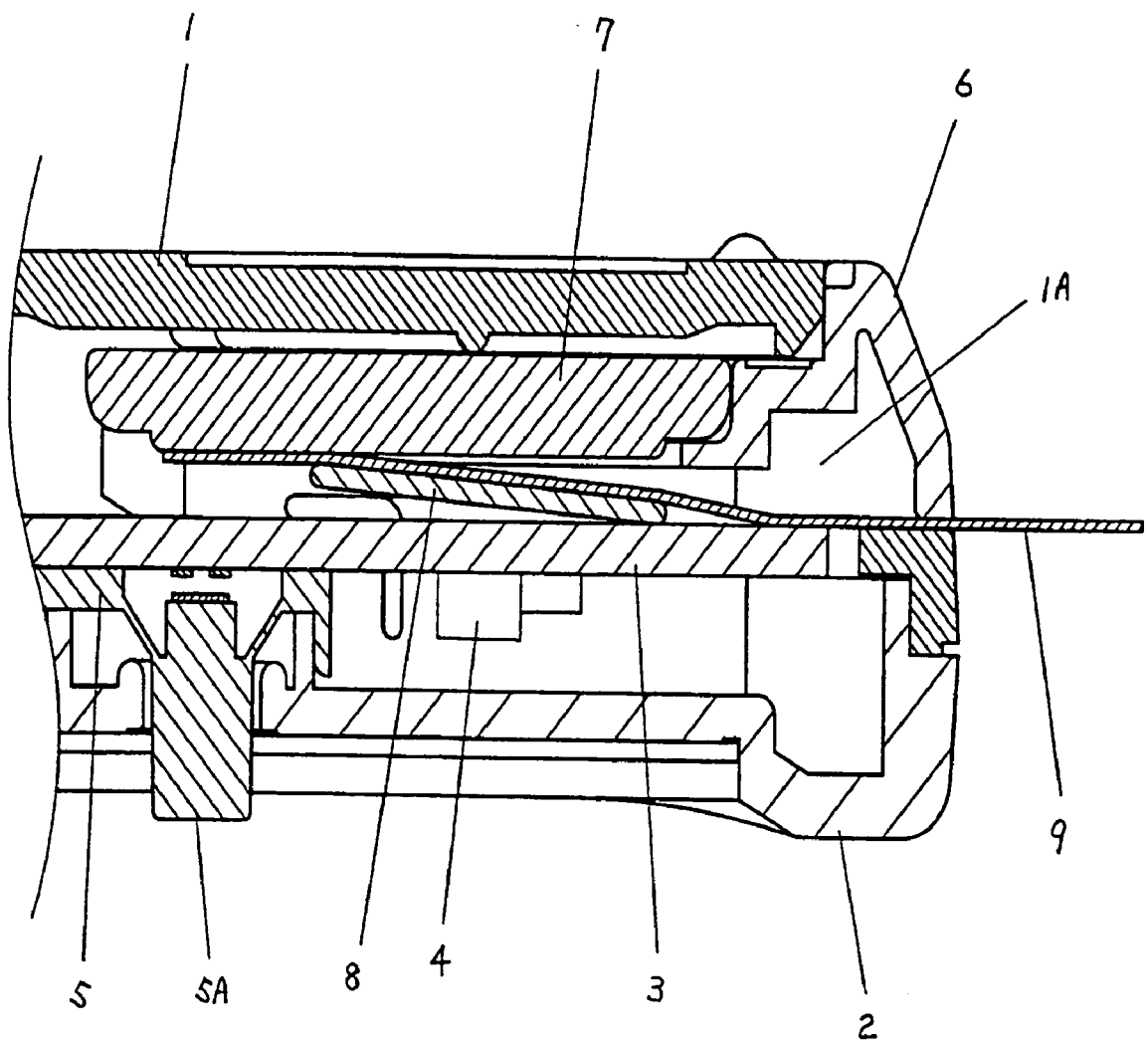
FIG. 4 is a cross-sectional view of a conventional remote control transmitter.
Figure 5:
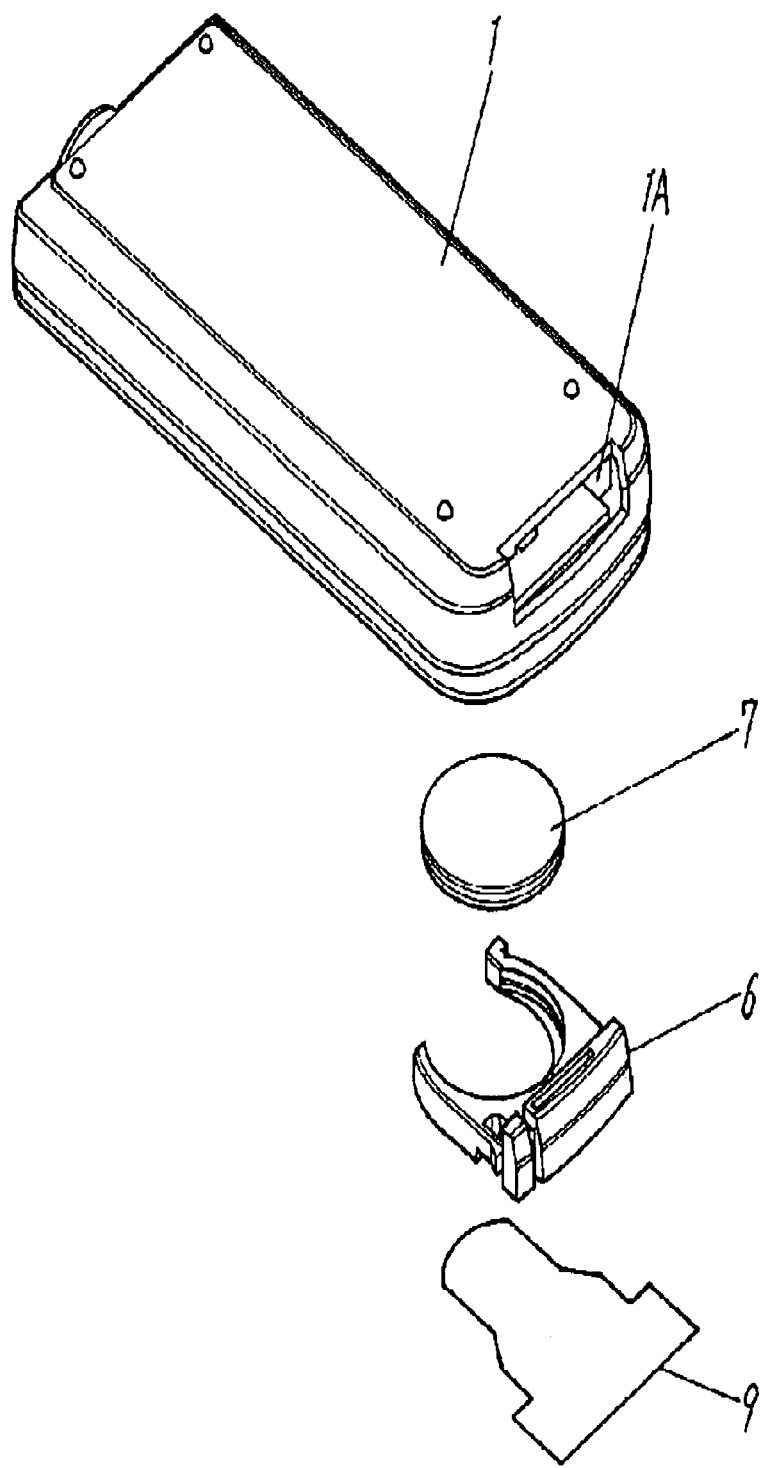
FIG. 5 is an exploded perspective view of the conventional remote control transmitter.

A pair of hook portions 12C may be formed on side edges of sheet 12 having them contact with protrusions 11C formed on under-housing 11, as in case of FIG. 3(*b*). A hook portion 12D in an uplifted dome shape can also be formed in a center of sheet 12 having it come into contact under-housing 11 or holder 6 as in FIG. 3(*c*). A hook portion 12E in substantially a key shape can as well be formed having it set into a triangular shape of protrusion 11D, as in FIG. 3(*d*). They all embody the present invention and attain a similar effect.

As described, the present invention brings about advantageous effects to the remote control transmitter, that the sheet preventing electric discharge hardly comes off and the battery is securely prevented from exhausting.

What is claimed is:

1. A remote control transmitter comprising:
    a control circuit generating a remoter control signal,
    housing installing the control circuit inside,
    an operating portion having a plurality of operating keys arrayed outside an upper part of the housing,
    a holder fit into the housing and enabled to be set in and taken out of the housing through an opening of the housing,
    a button type battery held in the holder, with an electrode of the control circuit resiliently contacted with the battery, and
    a sheet put between the battery and the electrode,
    wherein, the sheet includes a hook portion coming into contact with one of the housing and the holder.

2. The remote control transmitter according to claim 1, wherein, the sheet includes the hook portion in a tongue shape bendable in up and down directions with regard to a surface of the sheet.

3. The remote control transmitter according to claim 1, wherein, the sheet includes the hook portion including one of a hole and a notch.

4. The remote control transmitter according to claim 2, wherein, the housing has a protrusion formed on the opening,
    wherein, the hook portion is bent by the protrusion,
    wherein, an end of the hook portion comes into contact with an inside wall of the holder.

5. The remote control transmitter according to claim 1, wherein, the button type battery is in a disc shape.

6. A sheet for preventing electric discharge of a button type battery, said sheet comprising:
    an insulating sheet, including a hole, shaped to prevent conductive contact between a battery and an electrode; and
    a hook portion, extending into the hole, said hook portion bendable upwards and downwards with respect to the surface of the sheet when said sheet is engaged with a holder or a housing.

7. The remote control transmitter according to claim 2, wherein, the button type battery is in a disc shape.

8. The remote control transmitter according to claim 3, wherein, the button type battery is in a disc shape.

9. The remote control transmitter according to claim 4, wherein, the button type battery is in a disc shape.

* * * * *